United States Patent [19]

Brown et al.

[11] 4,390,823

[45] Jun. 28, 1983

[54] MOTOR CONTROL SYSTEM INCORPORATING TOP SPEED LIMITING ARRANGEMENT

[75] Inventors: Jack Brown, Union; John W. Wurst, Dover, both of N.J.

[73] Assignee: The Singer Company, Stamford, Conn.

[21] Appl. No.: 10,453

[22] Filed: Feb. 8, 1979

[51] Int. Cl.³ ............................................. H02P 5/16
[52] U.S. Cl. ................................ 318/331; 318/345 CA; 318/345 G
[58] Field of Search ............ 318/345 CA, 345 G, 331

[56] References Cited

U.S. PATENT DOCUMENTS

| | | | |
|---|---|---|---|
| 3,177,417 | 4/1965 | Wright | 318/331 |
| 3,177,418 | 4/1965 | Meng | 318/331 |
| 3,286,151 | 11/1966 | Dinger | 318/345 CA |
| 3,302,088 | 1/1967 | Wigington | 318/331 |
| 3,569,807 | 3/1971 | Ulrich | 318/308 |

Primary Examiner—David Smith, Jr.
Attorney, Agent, or Firm—David L. Davis; Robert E. Smith; Edward L. Bell

[57] ABSTRACT

An SCR motor speed control system having a capacitor for triggering the SCR into conduction is provided with circuitry for limiting the top speed of the motor by sensing the armature back EMF generated during the non-conducting period of the SCR to determine the motor speed. When the speed is above a predetermined threshold value, a transistor is turned on to short circuit the charging path of the capacitor.

5 Claims, 1 Drawing Figure

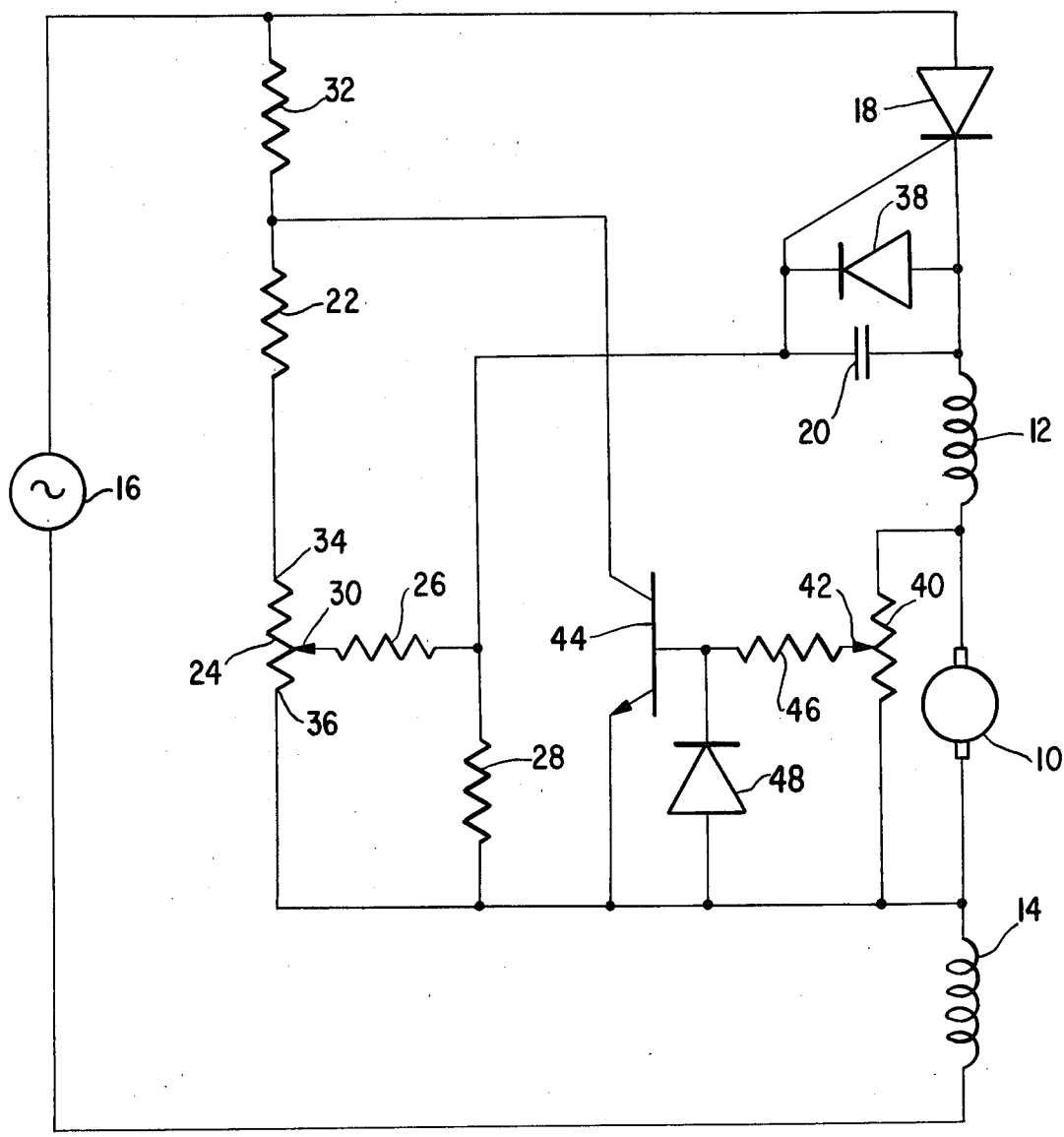

MOTOR CONTROL SYSTEM INCORPORATING TOP SPEED LIMITING ARRANGEMENT

BACKGROUND OF THE INVENTION

This invention relates to motor control systems and, more particularly, to a top speed limiting arrangement for incorporation in a DC motor control system.

Motor control systems are well known in the prior art for operating a DC motor from an AC supply at preselected speeds. Typically, such systems utilize phase control circuits connected between the DC motor and the cyclically varying AC power supply. A firing circuit is provided which responds to a speed selection, typically via a potentiometer, for firing the phase control circuit at the appropriate phase angle of the power supply so as to control the motor speed. In particular, the phase control circuit typically includes a silicon controlled rectifier (SCR) serially connected between the power supply and the motor and the firing circuit includes a charging capacitor connected to the gate electrode of the SCR so as to trigger the SCR upon reaching a predetermined voltage. Speed control is then attained by controlling the charging rate of the capacitor. Such systems typically further include some feedback from the motor for purposes of regulating the speed so that the selected speed is maintained irrespective of variations in line voltage and/or motor load.

Such prior art motor control systems commonly experience difficulties in holding the maximum operating speed because of the many variables involved, i.e., variations in initial machine torques, changes in machine torque with time, variations in line voltages, etc. In certain applications, it is critical to keep the maximum motor speed below some upper limit. For example, in a sewing machine having electronic pattern control, the response time of the servo systems for the bight and feed actuators sets the upper limit on the speed of the sewing machine main drive motor.

It is therefore an object of this invention to provide a motor speed control system with an arrangement for limiting the top speed of the motor.

It is a further object of this invention to provide such an arrangement wherein desired speed settings below this upper limit are not affected.

SUMMARY OF THE INVENTION

The foregoing and additional objects are attained in accordance with the principles of this invention in a motor control system for operating a motor at preselected speeds and including means for connecting the system to a cyclically varying power supply, a phase control circuit connected between the motor and the power supply, and a firing circuit coupled to the phase control circuit for phase firing the phase control circuit to supply power to the motor during a portion of the cycle of the power supply, by providing means for limiting the top speed of the motor including means for providing a signal corresponding to the speed of the motor when the phase control circuit is not supplying power to the motor, and means responsive to the signal being above a predetermined threshold value for preventing the firing circuit from operating.

BRIEF DESCRIPTION OF THE DRAWING

The foregoing will be more readily apparent upon reading the following description in conjunction with the single FIGURE of the drawing which is a schematic circuit diagram of a motor speed control system incorporating an arrangement embodying the principles of this invention.

DETAILED DESCRIPTION

Referring now to the drawing, shown therein is a circuit for controlling the speed of a motor having an armature winding 10 and field windings 12 and 14. The motor windings are serially connected to a cyclically varying power supply 16 which may be commercially available 115 volt 60 hertz power. Serially interposed between the power supply 16 and the motor windings 10, 12, and 14 is a silicon controlled rectifier (SCR) 18. When triggered into conduction, the SCR 18 allows current to flow through the motor windings 10, 12 and 14 during the positive half cycles of the power supply 16.

To trigger the SCR 18 into conduction, there is provided a firing circuit which includes a charging capacitor 20 and a current control circuit comprising the resistors 22, 24, 26 and 28. The charging capacitor 20 is connected across the gate and cathode of the SCR 18 and, as is well known in the art, when the voltage across the charging capacitor 20 reaches a predetermined threshold level, the SCR 18 is triggered into conduction. Within a positive half cycle of the power supply 16, the sooner the voltage across the charging capacitor 20 reaches that predetermined threshold value, the sooner the SCR 18 is triggered into conduction and the more current flows through the motor windings 10, 12 and 14. Therefore, to increase the motor speed, the charging capacitor 20 is charged more quickly so that the SCR 18 is triggered earlier in the positive half cycle and to drive the motor slower, the capacitor 20 is charged at a slower rate so as to trigger the SCR 18 at a later point in the positive half cycle.

The rate at which the capacitor 20 is charged is determined by the setting of the tap 30 of the potentiometer 24. The charging path for the capacitor 20 is from the power supply 16, through the resistor 32, through the resistor 22, through the potentiometer 24, through the tap 30, through the resistor 26, through the capacitor 20, through the field winding 12, through the armature winding 10, through the field winding 14, and back to the power supply 16. Therefore, the closer that the tap 30 is to the end 34 of the potentiometer 24 the faster the charging rate of the capacitor 20 and the faster that the motor will run. Conversely, the closer that the tap 30 is to the end 36 of the potentiometer 24 the slower the charging rate of the capacitor 20 and the slower that the motor will run. During the negative half cycles of the power supply 16, the capacitor 20 discharges through the gate-cathode path of the SCR 18; through the resistor 28, the armature winding 10 and the field winding 12; and through the reverse path of the charging network. The diode 38 prevents excessive reverse voltage from appearing across the cathode-gate of the SCR 18.

The aforedescribed circuit is self regulating in that prior to the firing of the SCR 18, as the armature winding 10 rotates through the residual magnetic field set up by the field windings 12 and 14, a back EMF is generated in opposition to the capacitor charging path which is directly proportional to the speed of rotation of the armature winding 10. This voltage on the armature winding 10 prior to firing the SCR 18 bucks the flow of charging current to the capacitor 20 and causes a longer time to elapse before the voltage across the capacitor 20 reaches the firing voltage of the SCR 18. This automatically retards the firing angle, allowing the motor to reach a stable equilibrium speed. If a load is now applied to the motor, its speed tends to decrease, reducing the residual induced voltage in the armature winding 10 and automatically advancing the firing angle. This increases motor torque to handle the increased load and maintains motor speed essentially constant.

Although the aforedescribed circuit inherently sets the top speed of the motor for a given set of power supply parameters due to the values of the resistors 22–32, if the voltage of the power supply 16 should increase, the top speed of the motor would proportionally increase. As previously stated, this is undesirable. In accordance with the principles of this invention, there is provided circuitry for limiting the top speed of the motor independent of variations in voltage of the power supply. Further, this circuitry allows the motor speed control circuitry to function normally below this upper limit, by controlling the motor speed in accordance with the setting of the potentiometer 24. Accordingly, there is provided a potentiometer 40 connected across the armature winding 10. This potentiometer 40 is for the purpose of sensing the motor speed by providing a measure of the back EMF generated during the non-conducting period of the SCR 18. During the non-conducting period of the SCR 18, remanent, or residual, magnetism in the field laminations causes the rotating armature winding 10 to develop a DC voltage which is proportional to the magnetic field strength and to the motor speed. From the tap 42 of the potentiometer 40 which is connected across the armature winding 10, a portion of this generated voltage is applied to the base of a transistor 44 through a current limiting resistor 46. Very little base current will flow unless the applied base voltage exceeds the normal base-emitter voltage of the transistor 44. By adjusting the position of the tap 42 on the potentiometer 40, the transistor 44 can be made to turn on at a desired top motor speed. When the transistor 44 turns on, it applies a short circuit across the current control circuitry, preventing the capacitor 20 from charging and hence preventing the SCR 18 from firing, thus reducing the motor speed. However, when the motor is operated at lower speeds, essentially no current flows in the base circuit of the transistor 44, the transistor 44 remains non-conducting, and the SCR motor control circuit operates normally to control the motor speed in accordance with the setting of the potentiometer 24. The diode 48 prevents excessive reverse voltage from appearing across the emitter-base of the transistor 44.

Accordingly, there has been disclosed an arrangement for limiting the top speed of a motor. It is understood that the above described embodiment is merely illustrative of the application of the principles of this invention. Numerous other embodiments may be devised by those skilled in the art without departing from the spirit and scope of this invention, as defined by the appended claims.

We claim:

1. A motor control system for operating a motor at preselected speeds and including means for connecting said system to a cyclically varying power supply, a phase control circuit connected between said motor and said power supply, means for setting a speed for said motor, and a firing circuit coupled to said phase control circuit for phase firing said phase control circuit to supply power to said motor during a portion of the cycle of said power supply in accordance with the setting of said setting means,
   wherein the improvement comprises means for limiting the top speed of said motor including:
   means for providing a signal corresponding to the speed of said motor when said phase control circuit is not supplying power to said motor; and
   limiting means responsive to said signal for preventing said firing circuit from operating when said signal is above a predetermined threshold value corresponding to a desired top speed and for allowing said firing circuit to operate in accordance with the setting of said speed setting means when said signal is below said predetermined threshold value, whereby motor speed control is effected by the setting of said speed setting means only up to said desired top speed.

2. The motor control system according to claim 1 wherein said phase control circuit includes a silicon controlled rectifier, said firing circuit includes a charging capacitor connected across the gate and cathode of said silicon controlled rectifier, said speed setting means includes current control means connected in circuit with said charging capacitor for controlling the charging current supplied to said capacitor, the rate at which current is supplied to said charging capacitor controlling the motor speed by determining the point in each cycle of the power supply when said silicon controlled rectifier is fired, and said limiting means includes means for providing a path for bypassing said current control means.

3. The motor control system according to claim 2 wherein said signal providing means includes a resistor connected across the armature winding of said motor.

4. The motor control system according to claim 3 wherein said limiting means includes a transistor having its collector and emitter connected across said current control means, and said resistor includes an intermediate tap connected to the base of said transistor.

5. The motor control system according to claim 4 wherein said intermediate tap is movable in position along said resistor so as to provide a variable top speed limit for said motor.

* * * * *